No. 667,962. Patented Feb. 12, 1901.
A. A. TISDALE.
METHOD OF MAKING UP TENSION WHEELS.
(Application filed Nov. 6, 1899.)
(No Model.) 2 Sheets—Sheet 1.
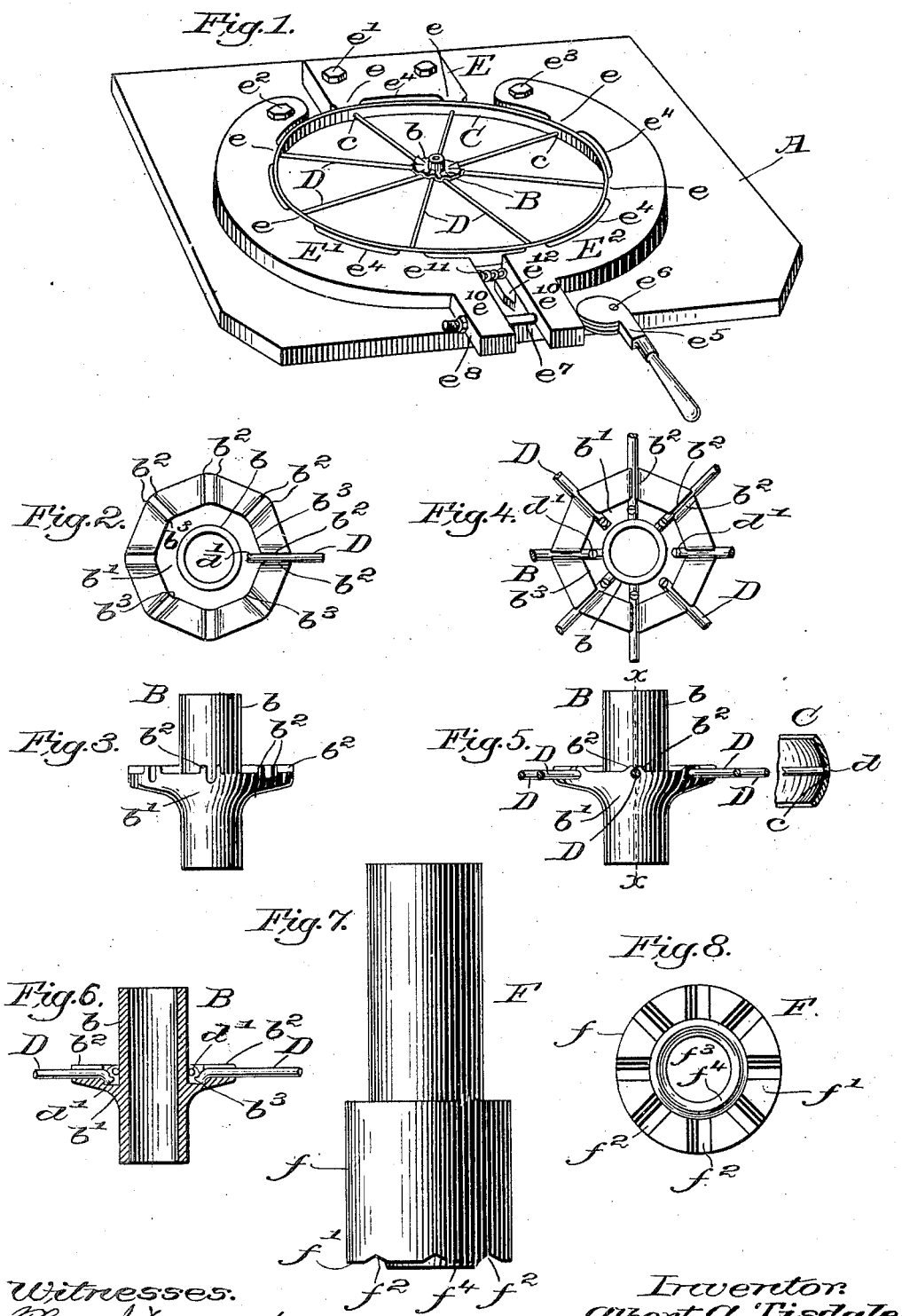
Witnesses.
Thomas J. Drummond
Fred S. Greenhof
Inventor.
Albert A. Tisdale,
by Crosby Gregory Attys.
THE NORRIS PETERS CO., PHOTO-LITHO., WASHINGTON, D. C.

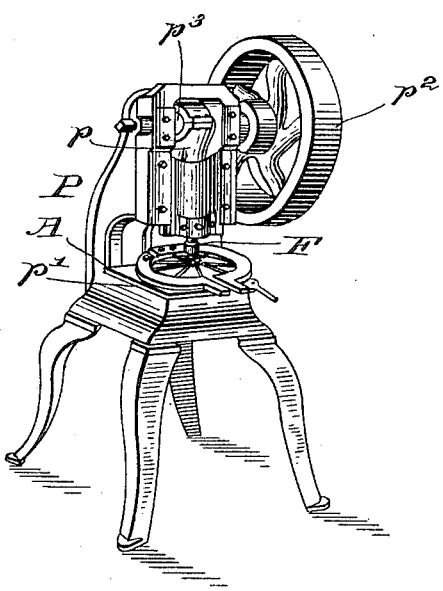

UNITED STATES PATENT OFFICE.

ALBERT A. TISDALE, OF LEOMINSTER, MASSACHUSETTS, ASSIGNOR TO THE WHITNEY REED CHAIR COMPANY, OF SAME PLACE.

METHOD OF MAKING UP TENSION-WHEELS.

SPECIFICATION forming part of Letters Patent No. 667,962, dated February 12, 1901.

Application filed November 6, 1899. Serial No. 735,881. (No model.)

*To all whom it may concern:*

Be it known that I, ALBERT A. TISDALE, a citizen of the United States, residing in Leominster, county of Worcester, and State of Massachusetts, have invented an Improvement in Methods of Making Up Tension-Wheels, of which the following description, in connection with the accompanying drawings, is a specification, like letters on the drawings representing like parts.

Existing methods of manufacturing tension-wheels with any considerable degree of nicety in the assemblage and adjustment of their component parts are inherently so expensive as to preclude the application of the product to any uses other than upon high-priced vehicles. So-called "tension-wheels" of a cheap grade have been produced; but, so far as I am aware, these have been lacking uniformly in equality of tension, and hence unequal to the rough usage to which they are subject, or if due regard has been given to the adjustment the increased labor charges have been met by a sacrifice in the quality of material used and permanency of structure.

Accordingly the object of my invention is a method of producing tension-wheels of nice adjustment and perfect balance in such a simple manner and with such minimum expenditure of labor that the utilization of this type of wheels may be extended to doll-carriages and the like without sacrifice in the quality of the material employed.

The various features of my invention will be illustrated and described fully in the accompanying drawings and specification and set forth in the claims.

Figure 1 is a view in perspective of apparatus constructed suitably to enable my method to be carried into effect, a wheel being shown in place. Figs. 2 and 3 are respectively a view in plan and one in elevation of my preferred form of hub separate from the wheel, Figs. 4 and 5 being similar views of the same after assemblage with the spokes, the adjacent portions of which are shown secured in place, Fig. 5 showing also a portion of the rim. Fig. 6 is a vertical sectional view on the line $x\,x$, Fig. 5, with the spokes shown in elevation. Fig. 7 shows in side elevation the preferred form of tool used in setting the central parts of the wheel; and Fig. 8 is a plan of the same looking from bottom to top, Fig. 7. Fig. 9 shows one form of machine or means for actuating the setting-tool.

In the accompanying drawings I have illustrated one form of apparatus by which my method may be carried into effect; but I do not claim said apparatus in this present application, it forming the subject of another application for United States Letters Patent, Serial No. 661,627, filed by me on the 13th day of December, A. D. 1897.

In the preferred form of apparatus selected for illustration and description as a convenient means whereby my method may be carried into effect a support or bed A is provided to receive the wheel parts during the operation of "making up," and on the support are placed the hub and rim in substantially the position shown in Fig. 1, where these parts are indicated by the reference-letters B and C, respectively, with the desired number of spokes D interposed. The rim may be of ordinary or of suitable construction, as desired, and in this instance is shown (see Fig. 5) as a metal strip formed with a slightly-convex tread and concave inner periphery for the sake of strength and pierced at $c$ to provide apertures, countersunk slightly, preferably on the tread side, to receive the heads $d$ of the spokes D when the latter are of the preferred form illustrated, having shanks, which in this instance are represented as of heavy wire without any projections to hinder their insertion in and passage through the rim-apertures until their heads $d$ are seated in the countersunk portions. After such insertion the inner spoke ends $d'$ should lie in proper position to be subjected to the operation of attachment to the hub, and I have found that a convenient, though not essential, order of assemblage is to place the hub in position centrally within the rim and then insert the spokes into place.

The construction of the hub may be varied within suitable limits; but in practice the form I have illustrated has been found satisfactory, presenting, as it does, a construction permitting permanent attachment of the spokes in position adjusted to provide for the requisite degree of tension and facilitating the automatic engagement of the spokes, respectively, at the proper region of each to insure uniformity of tension throughout the wheel and permitting this attachment in adjusted position to be effected by a single stroke of a suitable setting tool or means. As illustrated, the hub may be formed of an integral blank comprising a barrel $b$, to which the inner ends of the spokes D are attached in an annularly-disposed series of unions at the region $b'$, where for convenience of construction, symmetry, and stability a flange, continuous in this instance and integral with the barrel, is extended laterally to receive the inner ends of the spokes and afford a bearing or brace against any tendency of the wheel to dish. When such a flange is provided, integral or otherwise, a convenient configuration to secure the desired advantages of attachment, to which reference has been made already, finds provision in an annularly-disposed series of attaching or clamping devices $b^2$ for and traversed, respectively, by the inner portion of the spokes, and in this instance taking the form of lugs extending upward adjacent shoulders $b^3$, preferably continuous with one another and separated slightly from the barrel, the shoulders serving as an anvil or saddle across which the stroke of the setting means or tool bends, preferably, the shanks of the respective spokes, for a purpose to be set forth.

I am aware that it has been proposed to form heads of various shapes upon the inner ends of spokes and by various means to connect these permanent heads with the hub, and I wish at this juncture to lay stress upon the following disclosure of a feature of my invention which constitutes a notable point of differentiation between my novel method and previous devices. Spokes manufactured with inner heads, loops, hooks, or the like must of necessity be of standard and unvarying length, and an inequality of the radius from the rim to the hub between the respective regions of two spokes, while possibly of insufficient proportions to affect the tread of a wheel, especially in the case of doll-carriages or the like, frequently leaves one of the spokes loose, or if tension be put upon that spoke by tightening up the others an excessive draft on the wheel as a whole or on some portion of it results inevitably, and the life of the wheel is shortened. I have succeeded in eliminating this limitation upon the adaptability of this type of wheels by providing for positioning the spokes, rim, and hub for the operation of making up or setting, so that equality of radius and tension is insured regardless of the exact position of the extreme inner ends of the spokes and without the necessity for inner heads or the like. My method of accomplishing this is novel, and accordingly I do not limit myself to the specific means to be set forth in the following paragraphs.

The rim and hub being disposed concentrically with respect to each other upon the support A and the spokes being in place, traversing the portion of the hub where their attachment is to be effected, in this instance at the lugs $b^2$, of which there is shown a pair for each spoke, I prefer to provide in part, if not in whole, for the requisite tension before the setting operation proper. Accordingly I provide means of any suitable construction to force the spokes and adjacent portions of the rim inward, preferably radially, leaving the intermediate rim portions free, until the spokes are in proper position for attachment to the hub, to be effected in this instance by bending the lugs $b^2$ down to engage the spokes and clamp them to the flange. I do not, however, restrict myself to the use of this flange nor any specific means of attachment, since any means which can be caused to engage the spokes after the positioning step and regardless of the exact position of their inner extremities to hold them to the hub will fall within the spirit of my invention. In the instance illustrated the radial positioning of the spokes is accomplished by the action of projections $e$ on shaping devices (three in number in this instance) E E' $E^2$, a convenient arrangement being to attach one device or block E to the support A, as by bolts $e'$, with its projections $e$ presented inwardly toward the central position occupied by the hub, while the other shaping devices E' $E^2$ may be mounted to swing about pivots $e^2$ $e^3$, shown as bolts respectively positioned adjacent the block E, whence the shapers are extended around the wheel-bed, with their inner sides conforming in contour to the periphery of the rim, toward which they present projections $e$, similar in appearance and function to those similarly designated on the block E. The relative position of the shapers is such that when the free ends of the members E' $E^2$ are approached toward one another each projection $e$ will be brought into engagement with the head of a spoke and preferably the adjacent portion of the rim and will be caused to exert on the spoke-heads, respectively, a pressure sufficient to bend the rim at the spoke-seats inwardly and at the same time bring about inward radial movement of the spokes, while the intermediate portions of the rim will be free to bulge out into the spaces $e^4$ between the projections $e$. As one form of means to operate the shapers I have illustrated a cam-lever $e^5$, attached pivotally at $e^9$ to a draw-rod $e^7$, having an adjustable retaining-nut $e^8$, the lever coöperating with convenient portions of the shapers, as the offsets $e^9$ $e^{10}$, through which the draw-rod is passed loosely, the cam and nut acting, respectively, on the outer sides of the offsets. To separate the shapers automatically, suitable means may be provided, and for this purpose a spring $e^{11}$ is shown, while a stop $e^{12}$ will serve conveniently as one form of means to limit the movement of the levers toward each other and relatively to the support. After adjustment of the spokes, with the rim thrown temporarily out of normal contour, the attachment of the spokes to the hub is effected and the rim then released, its resiliency causing an assumption of the normal circular shape, in the establishment whereof the wheel as a whole is put under uniform tension by the draft exerted on the heads of the spokes, respectively. I prefer to utilize an additional means of preventing displacement by bending the ends $d'$ into such relation with the region of attachment, wherever situated, that an offset is formed in each spoke which will engage the material of the hub positively and prevent possibility of escape of the spokes therefrom. The manner in which this may be accomplished in the instance illustrated will readily be seen upon inspection of Figs. 4 and 6, where the ends $d'$ appear offset across the shoulder $b^3$ and of different lengths, illustrating clearly the flexible and automatic nature of my method and its adaptability to the production of a cheap product without extended preparation of parts.

Any suitable tool or means for performing the operation of attachment or setting of the parts may be used and similarly for offsetting the spoke ends when this is desired; but I have devised for this purpose a tool which serves both purposes in a unitary operation consisting of a single swaging stroke, and the preferred form of this tool is shown in Figs. 7 and 8, where in the face $f'$ of a cylindrical head $f$ are formed swaging-notches $f^2$ at suitable distances and of a suitable contour to receive the respective pairs of lugs $b^2$, which are engaged and bent over by the walls of the notches. This swaging action results upon approaching the tool to the hub axially and forcing it by suitable means into engagement with the lugs, a central bore $f^3$ being provided, preferably, to permit clearance of the hub-barrel $b$ when the same has an axial extension beyond the attaching region, as illustrated.

The means to offset the spoke end is shown as an annular rib $f^4$, disposed coaxilly between the swaging-notches and the bore and preferably protruding slightly beyond the face $f'$ for a purpose to be now set forth. I have found that the step of offsetting the spoke ends offers an available opportunity to exert a radial draft upon the spokes, affording thus a means of creating tension, which may be used alternately or in conjuction with the peripheral thrust already set forth or other suitable tension establishing means. When, therefore, the rib $f^4$ or its equivalent is forced against the spoke ends $d'$, it preferably bites into them slightly, being of suitable contour for that purpose, and imparts to them a draft in bending them over the attaching portion of the hub, in this instance the flange-shoulder $b^3$, so that adjustment for any inequalities having been effected automatically in positioning the parts before attachment each spoke is engaged at exactly the right portion to receive a draft uniform throughout the wheel with perfect equality of tension as the result. The protrusion of the rib enables it to engage the spokes and accomplish this draft before the lugs are bent down to clamp the spokes in permanent position, and it will be obvious that provision for variation in the degree of tension may be made at will in the construction of the tool.

The means for setting the wheel parts may be actuated in any suitable manner, and when a tool of the class described is used it may be operated by hand or by power, and in Fig. 9 I have illustrated such a tool F arranged to be operated by power, the form of actuating means P selected for illustration in this instance consisting of a power-press of such a well-known type as not to require extended description. The tool F is shown as carried by the plunger $p$, which with the tool may be actuated vertically in a reciprocating manner toward and away from the base $p'$, deriving its power from a suitable source (not shown) through the wheel $p^2$ and crank-shaft $p^3$. The wheel parts, in this instance shown as assembled upon a support A of the form illustrated in Fig. 1, may be introduced beneath the tool F for the setting stroke, after which the support may be withdrawn when separable from the base, as I prefer to have it, for convenience in assemblage of the wheel parts, though of course the support or bed might be integral with the base or bed proper of the press.

Having thus described my invention fully, I wish it to be understood that I do not limit myself to the exact construction herein shown, inasmuch as the same may be varied in many particulars without departing from the spirit and scope of my invention.

Having described my invention, what I claim as new, and desire to secure by Letters Patent, is—

1. The method of making up a tension-wheel, which consists in causing inward displacement of the rim at the several spoke-seats simultaneously, connecting the portions so displaced with the hub, and, thereafter, permitting said rim, by reason of its tendency to resume a normal contour, to establish tension in the wheel.

2. The method of making up tension-wheels, which consists in causing approach of the spokes and connected portions of the rim inwardly into adjusted position against the tension of said rim, with said spokes traversing the region of attachment to the hub; and effecting the attachment of said spokes, while so positioned, by causing engagement with said attaching region, of the spoke portions lying respectively adjacent the latter, regardless of the position of the inner extremities of said spokes.

3. The method of making up wheels under tension, which consists in causing the spokes and connected portions of the rim to be positioned with said spokes traversing the region of attachment to the hub; applying suitable means simultaneously to the portions of said spokes lying respectively adjacent said attaching region, regardless of the position of the inner extremities of said spokes, to force said portions into engagement with said region, said means coöperating with said region during engagement of said spokes between them to draw said spokes inwardly and attach them to said hub while under tension.

In testimony whereof I have signed my name to this specification in the presence of two subscribing witnesses.

ALBERT A. TISDALE.

Witnesses:
ALFRED L. BURDITT,
EDWARD S. CAWTHORNE.